US009887735B2

(12) United States Patent
Treyer

(10) Patent No.: US 9,887,735 B2
(45) Date of Patent: Feb. 6, 2018

(54) METHOD AND ARRANGEMENT FOR SIGNAL TRANSMISSION AND COMPENSATION OF BACK REFLECTIONS IN OPTICAL ACCESS PON SYSTEMS

(71) Applicant: Xieon Networks S.a.r.l., Senningerberg (LU)

(72) Inventor: Thomas Treyer, Munich (DE)

(73) Assignee: Xieon Networks S.a.r.l., Senningerberg (LU)

( * ) Notice: Subject to any disclaimer, the term of this patent is extended or adjusted under 35 U.S.C. 154(b) by 0 days.

(21) Appl. No.: 14/947,896

(22) Filed: Nov. 20, 2015

(65) Prior Publication Data
US 2016/0080032 A1    Mar. 17, 2016

Related U.S. Application Data

(63) Continuation of application No. 14/368,643, filed as application No. PCT/EP2012/076953 on Dec. 27, 2012.

(30) Foreign Application Priority Data

Dec. 30, 2011   (EP) .................................... 11196225

(51) Int. Cl.
*H04B 3/32*      (2006.01)
*H04B 3/23*      (2006.01)
(Continued)

(52) U.S. Cl.
CPC ................ *H04B 3/32* (2013.01); *H04B 3/23* (2013.01); *H04B 10/07953* (2013.01);
(Continued)

(58) Field of Classification Search
USPC ........ 398/128, 130, 135, 136, 137, 138, 139, 398/185, 159, 161, 182, 192, 194, 195, 398/202, 208, 209, 214, 41, 42; 385/88, 385/89, 92, 93; 372/29.01, 38.01, 38.02; 455/73, 78
See application file for complete search history.

(56) References Cited

U.S. PATENT DOCUMENTS 5,649,010 A    7/1997  Gysel et al.
6,441,937 B1   8/2002  Baur et al.
(Continued)

FOREIGN PATENT DOCUMENTS

WO        03/017534 A2    2/2003
WO        2013098325 A1   7/2013

OTHER PUBLICATIONS

International Search Report and Written Opinion for Application No. PCT/EP2012/076953, 12 pages, dated Mar. 14, 2013.
U.S. Appl. No. 14/368,643, filed Jun. 25, 2014, Thomas Treyer.

*Primary Examiner* — David Payne
*Assistant Examiner* — Omar S Ismail
(74) *Attorney, Agent, or Firm* — Nelson Mullins Riley & Scarborough LLP

(57) ABSTRACT

In a network terminal (ONU) of an optical network near end crosstalk (NEC) is compensated by a digital generated cancellation signal. To establish a connection with another terminal (OLT) signals avoiding NEC are transmitted and the compensation is performed while the power of the transmitted signal is increased in steps.

12 Claims, 5 Drawing Sheets

(51) Int. Cl.
  *H04B 10/2507* (2013.01)
  *H04B 10/272* (2013.01)
  *H04J 14/02* (2006.01)
  *H04Q 11/00* (2006.01)
  *H04B 10/079* (2013.01)

(52) U.S. Cl.
  CPC ....... *H04B 10/2507* (2013.01); *H04B 10/272* (2013.01); *H04J 14/0239* (2013.01); *H04Q 11/0067* (2013.01); *H04Q 2011/0049* (2013.01); *H04Q 2011/0081* (2013.01); *H04Q 2011/0083* (2013.01)

(56) References Cited

U.S. PATENT DOCUMENTS

| | | | | |
|---|---|---|---|---|
| 2002/0044322 A1* | 4/2002 | Blumenthal | ............ | H04B 10/00 398/147 |
| 2004/0247316 A1* | 12/2004 | Soto | ..................... | H04B 10/071 398/47 |
| 2005/0095994 A1* | 5/2005 | Schrodinger | .......... | H04B 10/40 455/78 |
| 2005/0123293 A1* | 6/2005 | Maki | ..................... | H04B 10/40 398/12 |
| 2008/0285634 A1* | 11/2008 | Raghavan | ................ | H04B 3/32 375/219 |
| 2010/0158180 A1* | 6/2010 | Ribo | ................... | H04L 7/0337 375/371 |
| 2010/0158527 A1* | 6/2010 | Mizutani | ................ | H04B 1/707 398/78 |
| 2010/0296813 A1* | 11/2010 | Chanclou | ................. | H04J 3/14 398/98 |
| 2014/0194071 A1* | 7/2014 | Wyville | ................. | H04B 1/525 455/73 |

* cited by examiner

METHOD AND ARRANGEMENT FOR SIGNAL TRANSMISSION AND COMPENSATION OF BACK REFLECTIONS IN OPTICAL ACCESS PON SYSTEMS

PRIORITY INFORMATION

This application is a continuation of U.S. application Ser. No. 14/368,643, filed on Jun. 25, 2014; which is a 35 U.S.C. 371 National Stage filing of International Application No. PCT/EP2012/076953, filed on Dec. 27, 2012, which claims priority to and benefit of European Patent Application No. 11196225.4, filed Dec. 30, 2011, the contents of each of which are hereby incorporated by reference herein.

FIELD OF THE INVENTION

The invention relates to a method and arrangement for signal transmission and compensating back reflections in an optical communication system. In particular, the invention relates to back reflections in NGOA (Next Generation Optical Access) and PON (Passive Optical Networks).

BACKGROUND OF THE INVENTION

The context of NGOA (Next Generation Optical Access) and PON (Passive Optical Networks) is known fin the art. The ONUs are located in the subscribers' homes, while the OLT is located in the central office.

FIG. 1 shows an ONU with the connection to the PON at the left. The numbers are taken from the use case, where attenuation in the PON is at maximum and the receive level at the ONU is just −45 dBm. The Tx signal has to have maximum strength in this case to overcome the PON attenuation in upstream direction. Therefore this is the worst case for near-end crosstalk: The Rx signal is weak and the Tx signal is strong.

In FIG. 1 the near-end crosstalk is assumed to be −20 dB. Such a back reflection in a connector has no significant influence to the transmission of the signals; especially the attenuation due to a bad connector can be neglected. Please note, that other systems like GPON are not vulnerable to near-end crosstalk and connector reflections. If, for example, existing GPON PONs are migrated to NGOA the operator may experience problems, because some of the new NGOA ONUs may not work after migration.

Reflections at connectors are specified by the suppliers of the optical connectors. Nevertheless these specifications are only valid, if the connectors are cleaned before they are plugged. In the field the operator cannot guarantee, that these cleaning procedures are done perfectly. This problem is increased in fiber-to-the-home applications, where the end user does the last connection manually.

This may have the following consequences:
- The ONU may not be able to establish a bi-directional connection to the OLT due to near-end crosstalk.
- The ONU may not be able to detect the source of the problem.
- The ONU may not be able to inform the OLT about the problem; the operator has no hint 42 where the problem is located in the field.
- The tolerance to near-end crosstalk of an NGOA ONU may be too low for real-world applications.

In general there are three principles to avoid near-end crosstalk (NEC):
- Wide spectral distance between Rx and Tx spectrum. For example Rx and Tx can be in different optical bands. This allows filtering in the optical domain to suppress NEC. GPON is an example.
- Two fibers. Rx and Tx happens at different fibers. Long-haul systems are an example.
- Ping-Pong: Rx and Tx happens at different time intervals.

BRIEF DESCRIPTION OF THE DRAWINGS

The invention is explained by way of example in more detail below with the aid of the attached drawings.

DESCRIPTION OF THE INVENTION

Figure 1:
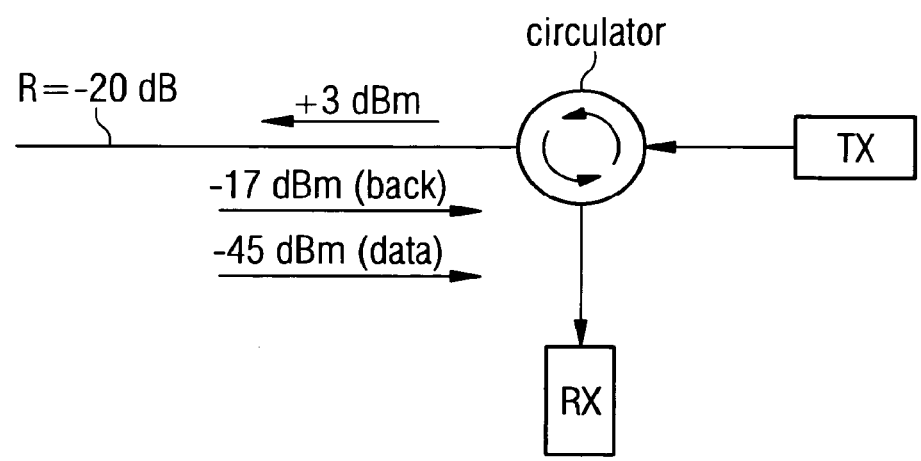
FIG. 1 is a schematic representation of an ONU connected to a PON.

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

To establish a connection the ONU scans the optical spectrum until it finds a downstream signal. During this scan the Tx power of the ONU is shut off and near-end crosstalk is not a problem. After the ONU has found a downstream signal and has locked to it the next step is to establish the upstream connection.

The ONU starts with a very small Tx power and increases the Tx power step by step until the OLT signals that the Tx power is ok. This Tx power control requires that the ONU shuts off its signal as soon as it loses the frame lock to the OLT downstream signal. Such a loss of frame lock may have many reasons and with the existing protocol there is no way for the ONU to decide whether the root cause is a back reflection or not.

The ONU switches off the Tx power immediately after losing downstream frame lock. It tries to re-establish frame lock. If possible, it put its local oscillator into a hold-over mode, where it is no longer under control of the downstream signal. Experience from current demonstrator measurements showed, that the ONU can receive the downstream signal in the hold-over mode for several seconds. The ONU uses this hold-over time to switch on and off its Tx power several times. The ONU correlates the Tx power with the frame lock respective the frame loss of the downstream signal. If there is a strong correlation, the ONU can decide, that the root cause of the problem is a back reflection from the PON.

The ONU may use a Tx on-off pattern, which is unique per ONU. E.g. it can be a bit sequence derived from its serial ID or from a hash of the serial ID. It can be a random sequence also. This allows the ONU to differentiate between its own near-end crosstalk and the near-end crosstalk from another ONU.

The ONU may use the Tx off phases of the Tx on-off pattern to recover the local oscillator lock. This allows Tx on-off patterns which are longer than several seconds. In principle the Tx on-off patterns can be indefinitely long.

The Tx on-off pattern described above can be used to increase the Tx power in the on-pulses of the pattern stepwise, until the OLT signals that it can receive an upstream signal. After that it is possible for the ONU to transmit data upstream to the OLT for several seconds. The ONU is not able to receive the downstream signal during this time due to the near-end crosstalk, but it is sufficient to signal the ONU-ID and the problem description to the OLT. The following data is of interest for an operator:

The ONU-ID: This allows the operator to determine the subscriber identity and therefore the location of the ONU in trouble (street, building and apartment). This information is necessary to send service persons directly to the fault location and to reduce OPEX (operational expenditure).

The receive power of the downstream signal and the Tx power, at which the ONU loses the downstream signal. This allows estimating the connector quality.

In this mode a non-duplex signal transmission is possible. Such a "Ping-Pong" protocol has a reduced data rate of course and the latency is increased significantly. Nevertheless it is possible to offer a fall-back data transmission to the subscriber until the fault has been removed by the operator. This may reduce OPEX, because the operator has much more time to solve the problem.

The spectrum of the Rx signal and the Tx signal are shifted by an intermediate frequency in the order of 1 GHz. As long as the spectral width of the Tx signal is smaller than this intermediate frequency the near-end crosstalk NEC can be filtered at the ONU receiver.

Figure 2:
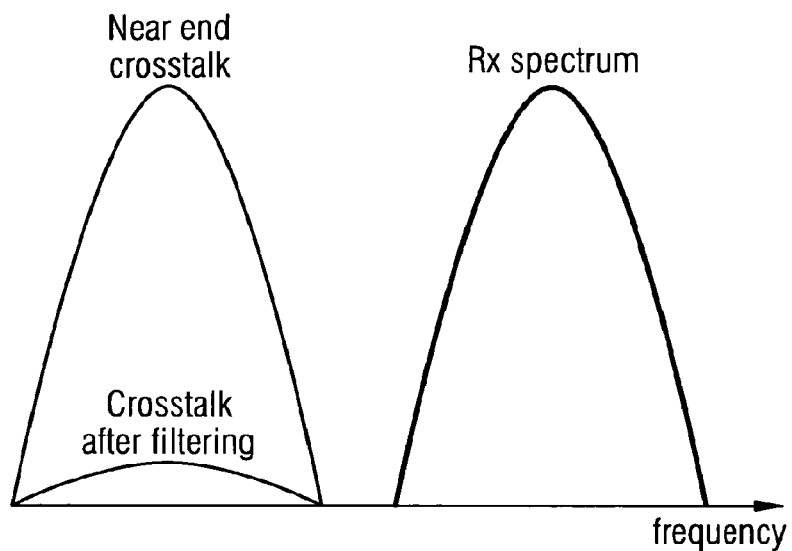
FIG. 2 is a schematic representation of the near-end crosstalk spectrum.

This situation is shown in FIG. 2. The near end crosstalk can be reduced significantly by suppressing frequencies outside the Rx spectrum. For the ONU transmitter it is difficult to achieve a Tx spectrum, which is as narrow as shown in the figure above. The shape of the Tx spectrum depends on the Tx modulator used. A phase modulator based upon a SOA shows a much broader Tx spectrum.

Figure 3:
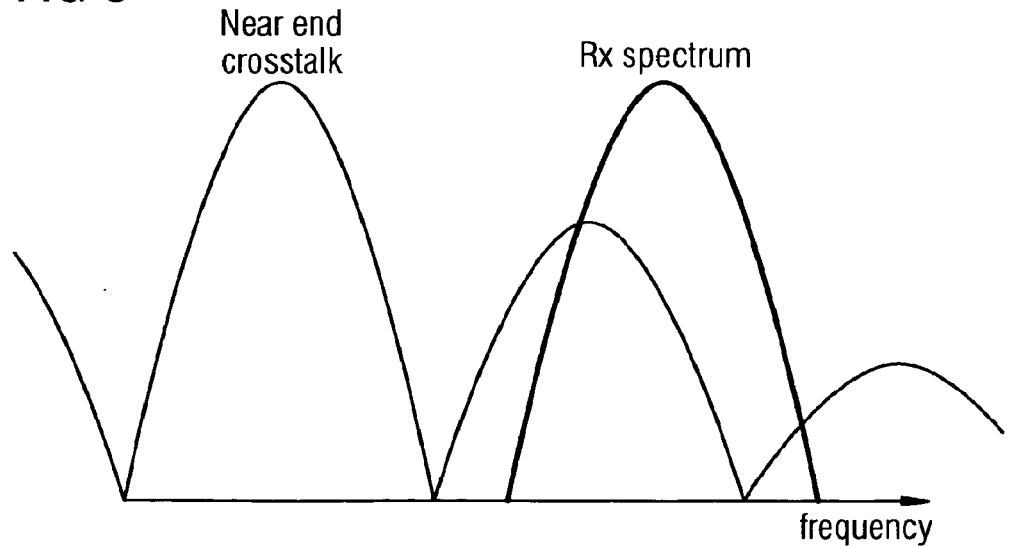
FIG. 3 is a schematic representation of near-end crosstalk spectrum according to an embodiment of the invention.

The resulting crosstalk spectrum is shown in FIG. 3. Since parts of the Tx spectrum are folded into the Rx spectrum filtering cannot handle this situation.

Figure 4:
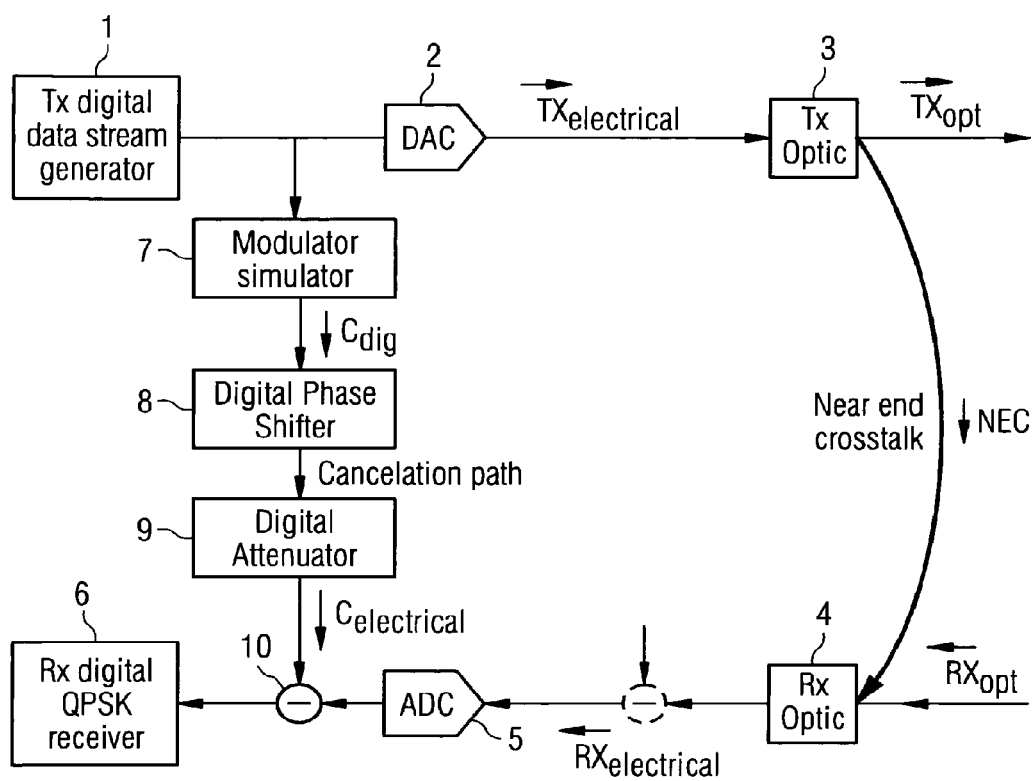
FIG. 4 is a schematic representation of the cancellation path according to an embodiment of the invention.

One embodiment of the invention includes a novel cancellation path to the Tx/Rx signal processing as shown in FIG. 4 depicting e.g. an ONU. A data signal generator 1 is connected via a digital-analog-converter 2 with an optical transmitter 3 emitting a modulated optical signal $TX_{opt}$. A downstream optical signal $RX_{opt}$ is received from the OLT by an optical receiver 4 and demodulated into an electrical signal, which is fed via a analog-digital-converter 5 and via a subtractor to a digital receiver 6 retrieving the data. Near end crosstalk is coupled from the output of the optical transmitter 3 to the optical receiver 4.

The new cancellation path 7-9 includes a modulation simulator 7, a phase shifter 8, and a attenuator 9 connected in series. To compensate the NEC signal the modulation simulator 7 has to generate a compensation signal $C_{dig}$ with the spectrum of the NEC signal. A good approximation is the emitted optical signal but transformed to the "electrical" domain (frequency band) respectively digital domain. In this embodiment the "electrical" signals are processed in digital form. The phase and attenuation of the compensation signal $C_{dig}$ is adjusted by the phase shifter 8 and attenuator 9 to the same values as the actual near-end crosstalk path has. The phase shifter can be realized with a digital all-pass filter and the attenuator is basically a multiplication. The achieved cancellation signal $C_{electrical}$ is subtracted from the received signal ($TX_{electrical}$) in the electrical or digital domain which comprises data and NEC.

The phase and amplitude of the cancellation path is adjusted by the following scheme:

1. Tx power of the ONU is reduced to a value slightly below the critical Tx power where frame 120 loss of the downstream signal happens.
2. The bit error rate (BER) of the downstream signal is measured.
3. A minimum controller adjusts phase and amplitude of the cancellation path to the minimum of BER.
4. After BER is minimized, the Tx power is increased stepwise; for every step the BER is minimized by adjusting the cancellation path.

This procedure guarantees that BER measurement is possible always, which is a pre-requisite to use a minimum controller.

5. In addition, the spectrum of the generated compensation signal may be optimized.

The scheme in the figure above does not take analogue filters into account which are in the Rx path between the Rx photo diode and the ADC. Such filtering can improve crosstalk tolerance (see prior art above).

Figure 5:
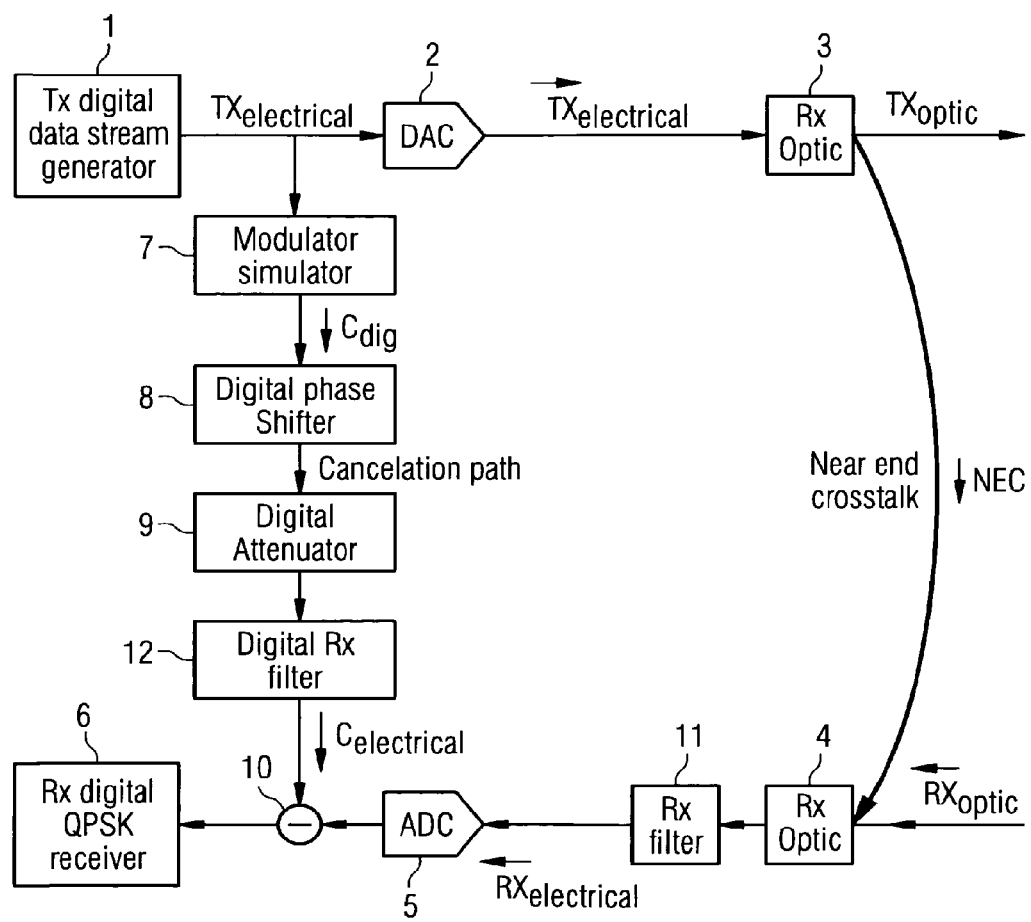
FIG. 5 is a schematic representation of the cancellation path including the Rx filter according to an embodiment of the invention.

FIG. 5 shows, how the cancellation path can be enhanced to handle an Rx filter. A new component is the Rx filter 11 in front of the ADC 5. The invention compensates for this new component by adding a digital compensation filter 12 with the same characteristics as the cancellation path.

The following calculation shows the mathematical transformation the Tx signal is undertaken when it is reflected in the PON. The same mathematical transformations have to be done in the cancellation path to cancel out the near end crosstalk.

Modulator:

$$TX_{optic}(t) = \sin(2\cdot\pi\cdot f_{optic}\cdot t - TX_{electrical}(t))$$

Crosstalk Path (Delay $\Delta t$ and Attenuation a):

$$NEC_{optic}(t) = a\cdot\sin(2\cdot\pi\cdot f_{optic}(t-\Delta t) - TX_{electrical}(t-\Delta t))$$

Homodyne Receiver:

$$NEC_{electrical}(t) = NEC_{optic}\cdot\sin(2\cdot\pi\cdot f_{optic}\cdot t)$$

$$NEC_{electrical}(t) =$$
$$\frac{a}{2}\cdot\cos(2\cdot\pi\cdot f_{optic}\cdot t - 2\cdot\pi\cdot f_{optic}(t-\Delta t) + TX_{electrical}(t-\Delta t)) -$$
$$\frac{a}{2}\cdot\cos(2\cdot\pi\cdot f_{optic}\cdot t + 2\cdot\pi\cdot f_{optic}(t-\Delta t) - TX_{electrical}(t-\Delta t)) =$$
$$\frac{a}{2}\cdot\cos(2\cdot\pi\cdot f_{optic}\cdot \Delta t + TX_{electrical}(t-\Delta t)) -$$
$$\frac{a}{2}\cdot\cos(2\cdot\pi\cdot 2\cdot f_{optic}\cdot t - 2\cdot\pi\cdot f_{optic}\Delta t - TX_{electrical}(t-\Delta t))$$

By filtering the optical frequencies due to the low-pass characteristic of the photo diode the remaining crosstalk signal is:

$$NEC_{electrical}(t) = \frac{a}{2}\cdot\cos(2\cdot\pi\cdot f_{optic}\cdot \Delta t + TX_{electrical}(t-\Delta t))$$

The cancellation path must produce the same mathematical transformation, based upon three parameters, which need to be controlled by the minimum controller:

The optical carrier phase $o_{je}$.
The baseband delay $\Delta t$.
The attenuation a.

$$C_{electrical}(t) = \frac{a}{2} \cdot \cos(o_{je} \cdot \Delta t + TX_{electrical}(t - \Delta t))$$

The index "electrical" is used for signals in the electrical and in the digital domain. The optical carrier phase oje has a limited stability due to the limited coherence length of the laser in the ONU. For example today a typical NGOA laser has a coherence length of 400 m. This restricts the maximum length of the fiber between ONU and the location of the reflection to 100 . . . 200 m, depending on the required NEC suppression. This is sufficient to handle a reflection due to the cabling inside a larger multi-dwelling building. If the reflection is further away from the subscriber's home the specification of laser line width and coherence length need to be improved.

The baseband delay can be estimated by switching Tx on and off. The crosstalk will increase signal amplitude. Therefore it is possible to determine the correlation between on-off state and measured amplitude for different delays. This correlation can be found best with the maximum possible Tx power. The method to find the maximum possible Tx power in NGOA even if NEC does not allow bidirectional communication is described above.

After estimating the parameter $\Delta t$ the other parameters can be optimized with a minimum controller based upon BER measurements.

The principle of NEC cancellation has been shown without considering polarization-diversity receivers.

Figure 6:
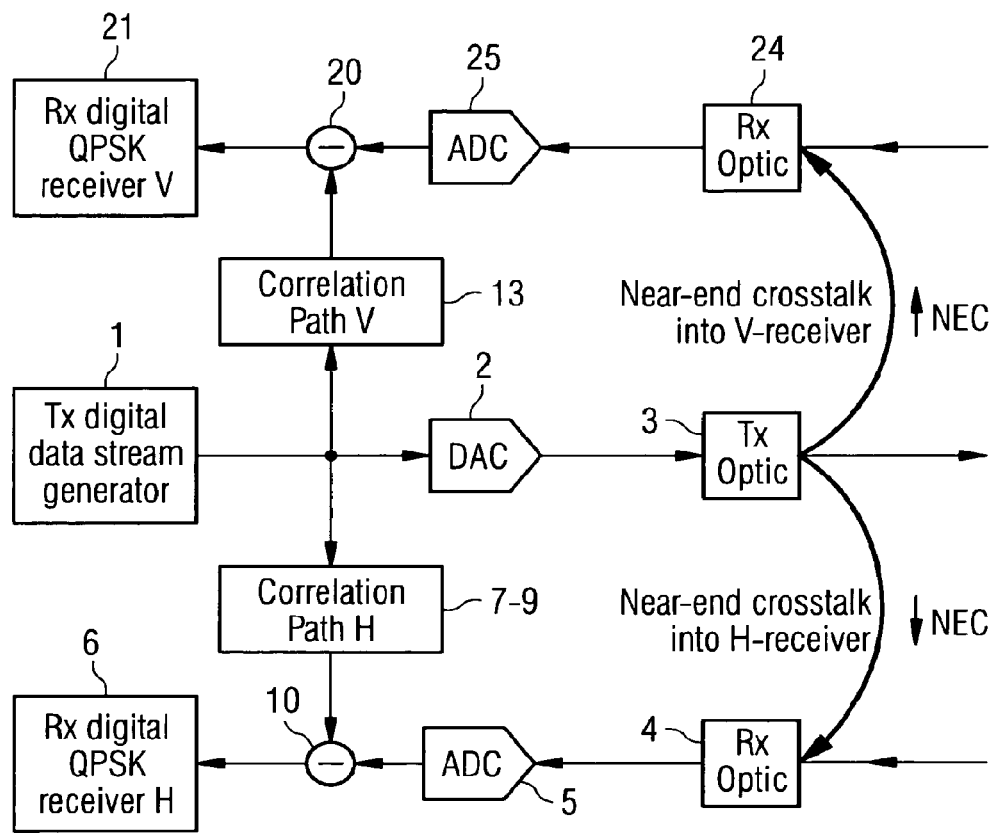
FIG. 6 is a schematic representation of the cancellation path according to an embodiment of the invention.

FIG. 6 shows, that two independent cancellation paths 7-9 and 13 can handle polarization-diversity receivers as well. A second receiver path includes a second optical receiver 24, a second analog-digital converter, a second subtractor and a second digital receiver 21 connected in series and shown as functional units.

According to an embodiment of the invention both cancellation paths 7-9 and 13 share the same baseband delay $\Delta t$, but a and $o_{je}$ are completely independent and are controlled by independent minimum controllers.

The calculation above has been made for a phase modulator. The same principle is possible for IQ-modulators or simple on-off-keying also by adapting the modulator simulation in the cancellation path.

The block diagrams above handle the use case, where a single point of reflection has to be cancelled out. By adding multiple cancellation paths or corresponding calculations it is also possible to handle multiple points of 186 reflections in the PON.

The cancellation paths shown above are implemented completely in the digital signal processing domain (left from the ADCs and DACs in the figures above). This may require the Rx ADC to handle both the receive signal and the NEC in its dynamic range. If the NEC is significantly larger than the signal itself this increases the required number of ENOBs of the ADC.

An alternative embodiment includes the computation of the cancellation signal in the digital domain and route it via a dedicated DAC into the analogue domain. Here it can be subtracted from the analogue input signal in front of the ADC (a subtractor is indicated by dashed lines). The resulting input signal requires less ENOBs with this hybrid digital/analogue approach than the pure digital approach.

The present invention is not limited to the details of the above described principles. The scope of the invention is defined by the appended claims and all changes and modifications as fall within the equivalents of the scope of the claims are therefore to be embraced by the invention. Mathematical conversions or equivalent calculations of the signal values based on the inventive method or the use of analogue signals instead of digital values are also incorporated.

ABBREVIATIONS AND REFERENCE SIGNS

NEC near end crosstalk
Tx transmitter
Rx receiver
$TX_{electrical}$ transmitter signal, electr. or digital domain
$RX_{electrical}$ receiver signal, electr. or digital domain
$TX_{opt}$ emitted optical signal
$RX_{opt}$ received optical signal
1 data signal generator
2 digital-analog-converter
3 optical transmitter
4 optical receiver
5 analog.digital-converter
6 digital receiver
7 modulation simulator
8 phase shifter
9 attenuator
10 subtractor
11 Rx filter
12 compensation filter
13 second cancellation path
20 second subtractor
21 second digital receivers
24 adapted optical receiver
25 second analog-digital-converter

The invention claimed is:
1. A method for signal transmission and compensating near-end crosstalk affecting phase or IQ modulated data signals transmitted in an optical network between line terminals emitting and receiving optical signals, comprising the steps of:
calculating in a digital signal processing domain and based on a digital data signal, a compensation signal corresponding to a crosstalk signal transformed into the electrical domain, said compensation signal including a timeshift accounting for a baseband delay associated with a cross talk path;
attenuating and phase shifting the compensation signal achieving a digital cancellation signal, to account for an optical carrier phase and to thereby adjust in the digital signal processing domain the phase shift and attenuation applied to the compensation signal to have same values as an actual near-end cross talk path has; and
subtracting the cancellation signal from a received, demodulated and analog-digital converted signal or after digital-analog conversion of the cancellation signal directly from the demodulated signal.

2. The method according to claim 1, comprising further the steps of:
filtering the received signal in the electrical or digital domain; and
filtering the compensation signal in the digital domain.

3. The method according to claim 1, wherein the compensation signal is calculated according to the transmitted optical signal transformed into the electrical domain.

4. The method according to claim 1, processed in at least one line terminal comprising further the steps of:
   signaling from an optical network termination with low power to an optical line terminal (OLT) that the optical network unit (ONU) is ready to receive a data signal;
   wherein the ONU increases the power of the transmitted optical signal;
   wherein the ONU shuts down the power of the transmitted optical signal as soon as the ONU looses a frame lock; and
   wherein the ONU determines near end crosstalk as reason for the frame loss and starts compensation.

5. The method according to claim 4, comprising further the step:
   the ONU transmits its identity number to verify near end crosstalk.

6. The method according to claim 4, comprising further the step:
   the ONU transmitting an on-off pattern to inform the OLT in a on phases and for its own clock recovery in a off phases.

7. The method according to claim 6, comprising further the step:
   the OLT transmitting a data signal to the ONU during the off phases.

8. An optical network element including a data source, a digital-analog-converter, an optical transmitter in a transmitting part; and an optical receiver, an analog-digital-converter, and a digital receiver in a receiving part, comprising:
   a cancellation path including a phase or IQ modulation simulator, a phase shifter, and a digital attenuator connected in series and generating a cancellation signal, which is subtracted from a received signal in a digital or electrical domain, wherein the phase or IQ modulation simulator is connected to receive a digital data signal from said data source and to generate, by digital signal processing, a compensation signal based thereon, said compensation signal including a timeshift accounting for a baseband delay associated with a cross talk path,
   and wherein said phase shifter and digital attenuator are configured to phase shift and attenuate said compensation signal, to account for an optical carrier phase and to thereby adjust in a digital signal processing domain the phase shift and attenuation applied to the compensation signal to have same values as an actual near-end cross talk path has.

9. An optical network element according to claim 8, comprising:
   a Rx-filter inserted in the path of the received signal; and
   a digital cancellation filter inserted in the cancellation path.

10. An optical network element according to claim 8, comprising:
   the first and a second cancellation path to compensate near end crosstalk signals of a received polarization multiplex signal.

11. A method for signal transmission and compensating near end crosstalk in an optical network transmitting data signals between line terminals emitting and receiving optical signals, comprising the steps of:
   calculating in the digital signal processing domain and based on a digital data signal, a compensation signal corresponding to a crosstalk signal transformed into the electrical domain, said compensation signal including a time shift accounting for a baseband delay associated with a cross talk path;
   attenuating and phase shifting the compensation signal achieving a digital cancellation signal, to account for an optical carrier phase and to thereby adjust in a digital signal processing domain the phase shift and attenuation applied to the compensation signal to have the same values as an actual near-end cross talk path has;
   subtracting the cancellation signal from a received, demodulated and analog-digital converted signal or after digital-analog conversion of the cancellation signal directly from the demodulated signal;
   reducing the power of the transmitted optical signal below a critical value when a frame loss occurs;
   measuring a bit error rate (BER);
   optimizing phase and amplitude of the cancellation signal to achieve a minimum BER;
   increasing stepwise the power of the transmitted optical signal; and
   repeating the steps of increasing the power and minimizing the BER.

12. The method of claim 1, wherein the attenuating and phase shifting of the compensation signal is based on an optical carrier phase parameter and an attenuation factor parameter, and wherein said optical carrier phase parameter and attenuation factor parameter are optimized based upon BER measurements.

* * * * *